Patented July 15, 1941

2,249,535

UNITED STATES PATENT OFFICE 2,249,535

ACETYLENIC ACID-POLYHYDRIC ALCOHOL RESINS

Alexander Douglas Macallum, Niagara Falls, N. Y., assignor to E. I. du Pont de Nemours & Company, Wilmington, Del., a corporation of Delaware No Drawing. Application July 22, 1938,
Serial No. 220,793

7 Claims. (Cl. 260—2)

This invention relates to synthetic resins of a new type and more particularly to the preparation of resins by reacting propiolic acid or other alpha acetylenic acid with certain organic hydroxy compounds.

It is an object of my invention to provide synthetic resins of a new type, which are useful as ingredients in coating compositions and in preparing molded articles of manufacture. It is a further object to provide a method of preparing these resins whereby propiolic acid and/or a homolog thereof is reacted with certain organic hydroxy compounds, particularly certain polyhydric alcohols. These and other objects will be apparent from the ensuing description of my invention.

I have discovered that when propiolic acid is reacted with organic hydroxy compounds of the class set forth below, e. g. by heating the acid and the hydroxy compound in the presence or absence of a suitable catalyst, a complex resinous reaction product is formed instead of a simple ester. Although the exact nature of the reaction which occurs is not entirely understood, its occurrence to form resins is apparently due to the bifunctional character of propiolic acid and to the presence in the hydroxy compound of not less than two reactive constituents, at least one of which is a hydroxyl group. Evidence at hand indicates that the reactions which take place involve both the carboxyl and the acetylenic groups of the propiolic acid molecule and at least two reactive constituents in the molecule of the hydroxy compound, at least one of these constituents being an hydroxyl group.

The present resins may be formed and the above objects may be accomplished in accordance with my invention by reacting propiolic acid or a homolog thereof with a hydroxy compound selected from the group consisting of monohydric phenols containing at least one unsubstituted ortho- or para-hydrogen atom, polyhydric phenols and polyhydric alcohols. The reaction may be effected, for example, by heating a mixture of the reactants, preferably at a temperature within the range of 80–150° C., although somewhat lower or higher temperatures than these may be employed. Catalysts, e. g. acids or acid salts, such as those commonly employed in esterification or etherification reactions, may be added to the mixture in order to accelerate the reaction or to facilitate its occurrence at a temperature lower than would otherwise be necessary. However, the presence of such catalyst is not essential. Also in the case of the less reactive or the insoluble or difficultly soluble hydroxy compounds, certain salts or substances may be added to the reaction mixture, the function of these added agents being to increase the solubility of the hydroxy compound in the reaction mixture or to cause its swelling, as for instance in the case of cellulose, whereby reaction may thus be facilitated.

The following compounds are illustrative of the hydroxy compounds which may be used as reactants in the formation of the present resins: ethylene glycol, propylene glycol, butylene glycol, trimethylene glycol, tetramethylene glycol, pentaglycol, and diethylene glycol and polyglycols generally; glycerol and polyglycerols generally; erythritol, pentaerythrite, arabitol, xylitol, mannitol, dulcitol and sorbitol; polyvinyl alcohol, and carbohydrates generally such as sucrose, maltose, lactose, glucose, celluloses and starches; phenol, cresols, thymols and other unsubstituted or partly substituted monohydric phenols; naphthols; polyhydric phenols such as resorcinol, quinol, catechol, pyrogallol, phloroglucinol and the like.

As regards the monohydric phenols it should be stated that so far as I am aware only those monohydric phenols which have at least one unsubstituted ortho- or para-position in the aromatic nucleus are suitable as reactants in forming the present resins. Furthermore, of all of the hydroxy compounds which may be reacted in accordance with the present invention some are considerably more reactive than others and give products which are much more attractive from a practical standpoint. Accordingly, I prefer to practice my invention employing as a reactant, a polyhydric alcohol since polyhydric alcohols are generally more reactive and produce more useful resin products. In particular, I prefer to prepare the present resins employing ethylene glycol, glycerol, pentaerythrite or polyvinyl alcohol, although other polyhydric alcohols, particularly the dihydric, trihydric and tetrahydric alcohols, may be used with excellent results.

The exact nature of the reactions by which the present resins are formed is not well understood; however, it is known that the resulting resins consist chiefly of complex esters or mixtures thereof. Furthermore, it is believed that the resins produced from polyhydric alcohols are complex ester acetals or ester ketals. In the reaction with glycerol, for example, one molecule of propiolic acid could react with three hydroxyl groups of glycerol, presumably with the formation of an ester acetal of glycerol and formyl acetic acid, the simplest form of which theoretically possible would be depicted as follows:

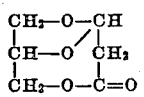

However, the possibility is not yet excluded that the products, e. g. from glycerol and propiolic acid, may comprise ketal esters stemming from the polyhydric alcohol and pyruvic acid. Thus, using glycerol and propiolic acid as reactants, the simplest form of ketal ester could be represented as follows:

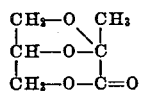

The products obtained are, in fact, much more complex than indicated by the above formulae, being most probably mixtures of polymers derived from the above acetal or ketal esters by formation of cross-linkages between two or more such molecules with the production of aggregates, the solubility and plasticity of which will depend upon the molecular size and character of the aggregates as determined, for example, by the relatively straight or branched chain structure of the polymer. The polyfunctionality of the initial reactants increases the number of ways in which they can react and thus accounts for the formation of such heat-hardened resinous polymers from propiolic acid and the hydroxy compounds set forth above.

In the case of ethylene glycol, resin formation may be visualized as resulting from acetal or ketal formation involving hydroxyl groups of the glycol and the acetylenic group of the acid, together with ester formation involving a hydroxyl group of the glycol and the carboxyl group of the acid. The reaction mechanism is probably similar to that suggested above when glycerol is employed as the hydroxy compound. Similar mechanisms may be postulated to explain the formation of the resinous products from other polyhydric alcohols and propiolic acid.

The reaction with monohydric phenols is believed to involve the addition of phenol residues to the triple bond of propiolic acid together with the esterification of the carboxyl group of the acid. There is some evidence that in the addition at the triple bond an ortho- or para-hydrogen atom of the phenol adds to the alpha or beta carbon atom of the acid molecule resulting in the production of complex internal ester derivatives of hydroxylated diphenyl propionic acids. Here, the active ortho- or para-hydrogen atom of the phenol acts as does the hydrogen atom of the hydroxyl group in the case of polyhydric alcohols. While any monohydric phenol which is unsubstituted in at least one ortho- or para- position may be expected to react in accordance with the present invention, such monohydric phenols are considerably less reactive than the polyhydric phenols. Thus quinol is much more reactive than phenol.

The formation of resinous products in accordance with my invention is illustrated by the following examples:

*Example 1*

A mixture of propiolic acid and ethylene glycol in molecular proportions of 0.66 mol of 91% acid to 1 mol of glycol was heated at a temperature of 110–115° C. for about 140 hours. The weight of the resulting product was about 78% of the weight of the original reactants. The product, containing about 41.7% of combined propiolic acid, comprised a pale brown, viscous, water-soluble, liquid resin serving as a good plasticizer for certain polyvinyl alcohol esters. It could be converted by continued heating at 150° C. to a transparent, brownish, solid resin which is hard, tough and insoluble in water.

*Example 2*

An equimolecular mixture of 91% propiolic acid and 95% glycerol was heated at 110–115° C. for 120 hours to give a yellow, water-soluble viscous liquid containing substantially no free acid and approximately 39.6% by weight of combined propiolic acid. In a similar experiment employing the same quantity of reactants, the reaction mixture was heated at a temperature of 150° C. for 18 hours to obtain a brownish-yellow, hard, tough resin which was insoluble in water and which contained approximately 51.3% of combined acid. The liquid product obtained by heating the reaction mixture at 110–115° C. could also be converted to a hard, tough, insoluble resin similar to that obtained by heating at 150° C. by subjecting it to a further heat treatment at a temperature above the temperature originally used, e. g. at 150° C. In one experiment a reaction mixture consisting of one mol of 95% glycerol and approximately two mols of 91% propiolic acid was heated at 110–115° C. for 94 hours to obtain a brown, hard, tough, insoluble resin containing approximately 56.9% by weight of combined acid.

The experimental results which have been obtained show that not much more than about one mol of propiolic acid will react with three hydroxyl groups of glycerol, even though a large excess of the acid is employed. This can be interpreted as evidence that the reaction involved probably results mainly in the formation of polymerized internal ester acetal or ester ketal derivatives of glycerol and either formyl acetic or pyruvic acid, respectively.

*Example 3*

A mixture of pentaerythrite and 1.33 molecular proportions of 91% propiolic acid was heated 48 hours at a temperature of 110–115° C. The resulting product comprised a soft, straw-colored, rubbery material when wet, a tough, leathery material when dry. It was insoluble in water and most organic solvents other than glycol or propiolic or propionic acids in which it dissolved in the cold. Baked for a time at 150°, it set to a hard, tough, yellow resin, apparently soluble only in hot propiolic acid or glycol.

*Example 4*

A 10% aqueous solution of high viscosity polyvinyl alcohol, 6.7 parts by weight, was treated with 1 part of 97.8% propiolic acid and the solution heated in the form of a thin film on glass at 85° C. for about 4 hours. The product then comprised a nearly colorless film of good adherence, apparently quite insoluble in water and organic solvents like alcohols, ketones, ethers, nitriles, amides, acids, esters and hydrocarbons. When immersed in boiling water the film could be stripped off cleanly by use of a straight edged tool to yield a transparent, tough, flexible but non-elastic sheet. It contained the equivalent of 4.6% of combined propiolic acid as determined by saponification. A similar film obtained from such a polyvinyl alcohol-propiolic acid mixture to which a trace of hydrochloric acid (2 to 3 drops of a solution prepared by diluting ordinary concentrated aqueous hydrochloric acid with 100 parts of water) had been added as catalyst was found to be more adherent and to contain the equivalent of 12.3% of combined propiolic acid.

Example 5

Sucrose, heated for about 85 hours at 85° C. with 2.96 molecular proportions of 96.8% propiolic acid and a trace of hydrogen chloride, was converted to a black, stiff tar which was sparingly soluble in water, alcohols, acetone, ethers, chloroform and acids but readily soluble in propiolic acid and formamide. The black tar was purified by dissolving in formamide and precipitating from the resulting solution with water. Dried in vacuo at ordinary temperature, the product comprised hard, lac-like flakes, pulverizing to a brown, granular powder. The latter did not fuse at temperatures up to 240° C. It appeared from cold saponification with alcoholic potash to contain 31.2% of combined propiolic acid as against 31.4% calculated for a sucrose dipropiolate.

Example 6

A mixture of 9.4 grams of phenol, 7 grams of propiolic acid with 1.8 grams of zinc bromide added as catalyst, was heated 6 days at 85° C. to produce a red, transparent, easily fusible solid which was freed from volatile by-products and unreacted phenol by steam distillation. The distillation residue comprised a brownish, solid resin fusing at 60-70° C. which corresponded roughly in composition to a polymerized internal ester of a dihydroxy diphenyl propionic acid. Saponification of this product with hot alcoholic sodium ethylate, followed by acidification, yielded the corresponding free acid melting at about 100° C. and having a molecular weight of about 258 grams.

Example 7

An equimolecular mixture of quinol and propiolic acid was subjected to prolonged heating at 115° C. and the resulting product freed from unreacted quinol by dissolving in ethyl acetate and fractionally precipitating with petroleum ether. The precipitated product was a dark colored resin of molecular weight between 1200 and 1500 grams.

The formation of resinous products in accordance with the present invention is not restricted to the use of the specified hydroxy compounds alone as reactants with the propiolic acid, since other compounds commonly employed as reactants to modify properties of synthetic resins may be employed if desired. Thus, I have found that drying oils or unsaturated, long-chain fatty acids may be added to the reaction mixture for the purpose of modifying the properties of the resin. In this manner resins may be obtained which are especially attractive for use as ingredients in varnishes. The preparation of such modified resins is illustrated by the next example.

Example 8

A mixture of propiolic acid, glycerol and linseed oil in molecular proportions of 1:0.315:0.255, respectively, was heated for 88 hours at 110-115° C. The resulting product comprised an oil and a solid, both orange-colored. The oil contained 29.7% and the solid 59.9% of combined acid, calculated as propiolic acid. The oil was miscible with hydrocarbon solvents, vegetable oils and certain alcohols such as ethanol and butanol. It was superior to linseed oil in both drying and baking properties.

Homologues of propiolic acid, e. g. methyl, ethyl, propyl and amyl propiolic acids and the like, may be used in place of propiolic acid as the acid reactant in the preparation of the present resins. However, I prefer to employ propiolic acid since it is more readily available than are its higher homologues. The following example illustrates the reaction between tetrolic (methyl propiolic) acid and glycerol.

Example 9

A mixture containing 1.5 molecular proportions of tetrolic acid to 1 molecular proportion of glycerol was heated for about 300 hours at 110-115° C., whereupon a brown, tacky, water-soluble resin was obtained which contained approximately 63.2% of combined acid. This product hardened upon being heated for 12-18 hours in air at 140-150° C., the hardened resin being insoluble in water but rather brittle in comparison with the products obtainable from glycerol and propiolic acid.

In preparing the present resins the temperature at which the reaction should be effected will depend, naturally, upon the particular ingredients employed in the reaction. In general, temperatures in the range of 80 to 175° C. are quite suitable although lower or higher temperatures may be employed, if desired. In the preferred modification of my invention, I effect the initial reaction at a relatively low temperature, e. g. 80-120° C., and then complete the reaction, e. g. after the intermediate product has been applied to surfaces as a coating or has been molded, by subjecting it to a relatively high temperature, e. g. 150-175° C.

Various proportions of the hydroxy compound and propiolic acid, or a homologue thereof, may be used in practicing the present invention. Whether or not an excess of one or the other reactant is employed will depend upon the nature of resin desired. In general I find it economical to employ approximately one mol of propiolic acid for each quantity of the hydroxy compound corresponding to three reactive constituents in the hydroxy compound. Thus, when a polyhydric alcohol is employed a quantity of the alcohol corresponding to three hydroxyl groups per mol of propiolic acid is employed. In the case of monohydric phenols I prefer to employ a quantity of phenol which affords three reactive units, i. e. hydroxyl groups plus unsubstituted para- or ortho-hydrogen atoms, per mol of propiolic acid. An excess of either the hydroxy compound or the acid, however, is not harmful and may even be advantageous under certain circumstances.

Although I have described in the above examples the preparation of resins by heating reaction mixtures containing no diluent, it is obvious that a solvent or diluent for the reaction mixture may be employed without departing from the scope of my invention. Also resins may be prepared by reacting a mixture of hydroxy compounds with propiolic acid or by reacting a mixture of homologues of propiolic acid with one or more hydroxy compounds. Whether or not mixtures of the type suggested above should be employed will depend to a large extent upon the desired properties of the resin and its intended use.

The present resins, particularly those obtained by the use of ethylene glycol, glycerol, pentaerythrite or polyvinyl alcohol, are heat-hardenable and well adapted for use in preparing coating and molding compositions. When thermally set, they are characterized by their insolubility in water and in practically all organic solvents.

The use of substances to catalyze the reaction by which the resins are formed, although not essential, is frequently desirable, especially when the reaction proceeds slowly. For this purpose, hydrogen halides and other acids or acid salts such as those commonly used in catalyzing esterification or etherification reactions may be used to advantage. Also, when the hydroxy compound is insoluble or but slightly soluble in propiolic acid, substances such as zinc bromide, zinc chloride, lithium chloride, magnesium iodide, sodium iodide or potassium thiocyanate may be added to the reaction mixture to swell or increase the solubility of the hydroxy compound, e. g. carbohydrates, in the mixture. The presence of such compounds appears, in some instances, to have a catalytic effect upon the reaction in addition to its solubilizing effect upon the hydroxy compound.

My invention is not restricted to any of the specific proportions, procedural details or ingredients set forth hereinabove, which are intended to be merely illustrative and not restrictive, but includes all such variations, modifications and equivalents as fall within the scope of the appended claims.

I claim:

1. The process for producing a resin which consists in reacting a monobasic acetylenic acid having the general formula $RC\equiv COOH$, wherein R represents a member of the group consisting of hydrogen atom and alkyl radicals, with a polyhydric alcohol the reacting mixture consisting of said acid and said polyhydric alcohol as the only reactive ingredients.

2. The process for producing a resin which consists in reacting a monobasic acetylenic acid having the general formula $RC\equiv COOH$, wherein R represents a member of the group consisting of hydrogen atom and alkyl radicals, with a polyhydric alcohol at a temperature of 80 to 175° C. the reacting mixture consisting of said acid and said polyhydric alcohol as the only reactive ingredients.

3. The process for producing a resin which consists in reacting propiolic acid with ethylene glycol at a temperature of 80 to 175° C. the reacting mixture consisting of said acid and ethylene glycol as the only reactive ingredients.

4. The process for producing a resin which consists in reacting propiolic acid with glycerol at a temperature of 80 to 175° C. the reacting mixture consisting of said acid and glycerol as the only reactive ingredients.

5. A synthetic heat hardenable resin obtainable by reacting a monobasic acetylenic acid having the general formula $RC\equiv COOH$, wherein R represents a member of the group consisting of hydrogen atom and alkyl radicals, with a polyhydric alcohol the reacting mixture consisting of said acid and said polyhydric alcohol as the only reactive ingredients.

6. A synthetic heat hardenable resin obtainable by reacting a monobasic acetylenic acid having the general formula $RC\equiv COOH$, wherein R represents a member of the group consisting of hydrogen atom and alkyl radicals, with ethylene glycol at a temperature of 80 to 175° C. the reacting mixture consisting of said acid and said ethylene glycol as the only reactive ingredients.

7. A synthetic heat hardenable resin obtainable by reacting a monobasic acetylenic acid having the general formula $RC\equiv COOH$, wherein R represents a member of the group consisting of hydrogen atom and alkyl radicals, with glycerol the reacting mixture consisting of said acid and said glycerol as the only reactive ingredients.

ALEXANDER DOUGLAS MACALLUM.